(12) United States Patent
Shaw et al.

(10) Patent No.: US 8,415,628 B1
(45) Date of Patent: Apr. 9, 2013

(54) HERMETICALLY SEALED RADIATION DETECTOR AND METHODS FOR MAKING

(75) Inventors: Jeffrey Jon Shaw, Ballston Lake, NY (US); Craig Patrick Galligan, Cropseyville, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/285,905

(22) Filed: Oct. 31, 2011

(51) Int. Cl.
*G01T 1/20* (2006.01)
(52) U.S. Cl.
USPC .................................. 250/361 R; 250/370.11
(58) Field of Classification Search .............. 250/361 R, 250/370.11, 370.09; 257/433
See application file for complete search history.

(56) References Cited

U.S. PATENT DOCUMENTS

| | | | |
|---|---|---|---|
| 5,641,984 A | 6/1997 | Aftergut et al. | |
| 5,707,880 A | 1/1998 | Aftergut et al. | |
| 6,172,371 B1 | 1/2001 | Dejule et al. | |
| 6,278,118 B1 | 8/2001 | Homme et al. | |
| 6,320,181 B1 | 11/2001 | Noji et al. | |
| 6,642,524 B2 | 11/2003 | Vafi et al. | |
| 7,053,381 B2 | 5/2006 | Shaw et al. | |
| 7,473,903 B2 | 1/2009 | Dejule et al. | |
| 7,705,315 B2 | 4/2010 | Homme et al. | |
| 7,863,577 B2 * | 1/2011 | Nagano ..................... | 250/370.11 |
| 2003/0127600 A1 | 7/2003 | Vafi et al. | |
| 2004/0021084 A1 | 2/2004 | Shaw et al. | |
| 2004/0042585 A1 | 3/2004 | Nagarkar et al. | |
| 2004/0155320 A1 | 8/2004 | Dejule et al. | |
| 2006/0261286 A1 | 11/2006 | Homme et al. | |
| 2008/0083877 A1 | 4/2008 | Nomura et al. | |
| 2008/0137811 A1 | 6/2008 | Gadre et al. | |
| 2009/0181491 A1 | 7/2009 | Roizin et al. | |

FOREIGN PATENT DOCUMENTS

| | | |
|---|---|---|
| WO | 2006062598 A1 | 6/2006 |
| WO | 2011044199 A1 | 4/2011 |

OTHER PUBLICATIONS

Kim, et al., "New Fluxless Hermetic Sealing Technique Using Electroplated SN-RICH Soft Solder", Electronic Components and Technology Conference, 2007. ECTC '07. Proceedings. 57th, pp. 1155-1160, Issue Date : May 29, 2007-Jun. 1, 2007.

\* cited by examiner

Primary Examiner — David Porta
Assistant Examiner — Faye Boosalis
(74) Attorney, Agent, or Firm — Jennifer W. Haeckl

(57) ABSTRACT

A flat panel X-ray detector that comprises an X-ray panel and a scintillator layer disposed on a first surface of the X-ray panel, is disclosed herein. The flat panel X-ray detector further comprises a hermetic cover that covers the scintillator layer. The hermetic cover comprises a top surface and at least one sidewall extending away from the top surface. The flat panel X-ray detector further comprises a solder seal disposed between the hermetic cover and the X-ray panel. A rim of the sidewall is substantially embedded within the solder seal such that the rim does not directly contact the X-ray panel. A method for fabricating a flat panel X-ray detector is also disclosed.

20 Claims, 3 Drawing Sheets

HERMETICALLY SEALED RADIATION DETECTOR AND METHODS FOR MAKING

This invention was made with Government support under contract number HSHQDC-08-C-00138 awarded by U.S. Department of Homeland Security. The Government has certain rights in the invention.

BACKGROUND

Embodiments presented herein relate in general to radiation detectors and in particular to hermetically sealed radiation detectors.

Radiation detectors such as those used for detecting visible light, infra-red radiation, ultra-violet radiations, X-rays, and so forth are prolific in electronic imaging systems, for example. Such radiation detectors typically operate in an environment that may cause damage to the radiation detectors. For instance, foreign particles such as dust and pollen may damage visible light detectors. Some radiation detectors may also undergo physical changes upon exposure to environmental conditions such as moisture.

For instance, X-ray detectors comprise a scintillating material that converts X-ray photons into visible light photons. The visible light photons may then be detected by a photodiode array coupled to the scintillating material, to produce an electrical signal for further processing. The scintillating material comprises ionic materials such as cesium iodide (CsI). CsI is a crystalline material, with needle-shaped crystals. CsI crystals exhibit the property of hygroscopy. CsI crystals have a tendency to attract and hold water molecules. The hygroscopic property of the CsI crystals causes moisture ingression into the scintillating material which damages the structure of the crystals, thereby degrading the image quality of the X-ray detector.

Some known efforts to prevent moisture ingression comprise sealing the scintillating material with a hermetic or a semi hermetic cover over an X-ray glass panel. Known semi-hermetic seals are typically made up of organic materials such as epoxy sealants for providing a reduced moisture diffusion and ingression into the scintillating layer from the environment. However, the organic sealants do not provide complete hermetic sealing for the scintillating material and therefore, still cause damage to the image quality of the X-ray detector.

Replacing the organic sealants with metallic sealants, such as solders, have also been proposed. However, voids may form in the solder seal during this process. Such voids may provide paths for moisture ingress, thus, rendering the seal ineffective or substantially degraded. Moreover, the solder seal material should be compatible with the X-ray panel and the cover. Consequently, the choice of the cover material may be limited. Further, adequate adhesion of the cover to the X-ray panel through the solder seal may be difficult, especially, for applications in which the X-ray detector suffers mechanical stress.

Some other known efforts require a primer to be applied to the hermetic cover or the X-ray glass panel or both, to improve adhesion of the sealant and thus the impermeability of the seal. However, such solutions may not provide protection throughout the operating life of the scintillating material. Further, application of the primer adds to additional control of conditions within the fabrication process.

Similarly, a few other efforts comprise methods to improve the seal involving thin-film deposition of various moisture resistant layers. These methods, while helping to reduce the effects of moisture ingression and damage, may add significant processing complexity and cost as they typically involve vacuum deposition.

Therefore, there is a need for a solution for hermetically sealing such radiation detectors that overcomes these problems.

BRIEF DESCRIPTION

The above and other drawbacks/deficiencies may be overcome or alleviated by an embodiment of a method for fabricating a flat panel X-ray detector as disclosed herein. The method comprises forming a detector array on an X-ray panel. Further, a hermetic cover is bonded to the X-ray panel using ultrasonic soldering. The hermetic cover comprises a top surface and at least one side wall. Further, a rim of the side wall is embedded into a solder seal such that the rim of the hermetic cover does not come in direct contact with the X-ray panel.

An embodiment of a flat panel X-ray detector of the invention comprises an X-ray panel and a scintillator layer disposed on a first surface of the X-ray panel. The flat panel X-ray detector further comprises a hermetic cover that covers the scintillator layer. The hermetic cover comprises a top surface and at least one sidewall extending away from the top surface. The flat panel X-ray detector further comprises a solder seal disposed between the hermetic cover and the X-ray panel. A rim of the sidewall is substantially embedded within the solder seal such that the rim does not directly contact the X-ray panel.

According to another embodiment, an apparatus of the invention comprises a flat panel substrate and a radiation sensing structure disposed on a first surface of the flat panel substrate. The apparatus further comprises a hermetic cover that covers the radiation sensing structure. The hermetic cover comprises a top surface and at least one sidewall extending away from the top surface and is substantially transmissive for radiation being sensed by the radiation sensor. The apparatus further comprises a solder seal disposed between the hermetic cover and the flat panel substrate. A rim of the sidewall is substantially embedded within the solder seal such that the rim does not directly contact the flat panel substrate

DRAWINGS

These and other features, aspects, and advantages of the present system and techniques will become better understood when the following detailed description is read with reference to the accompanying drawings in which like characters represent like parts throughout the drawings, wherein.

DETAILED DESCRIPTION

Figure 1:
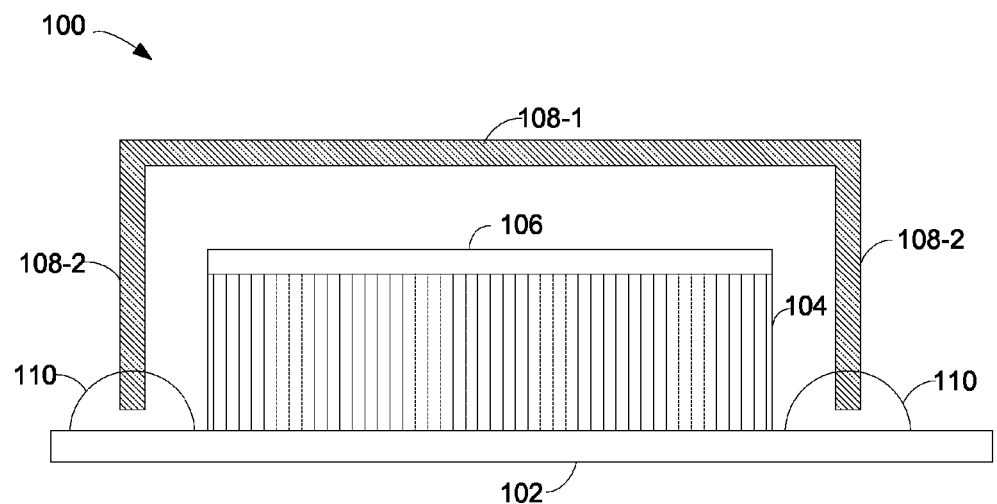
FIG. 1 illustrates a schematic profile of an example flat panel X-Ray detector, according to one embodiment.

Various embodiments will be described more fully hereinafter with reference to the accompanying drawings. Such embodiments should not be construed as limiting. For example, one or more aspects can be utilized in other embodiments and even other types of devices. In the drawings, like numbers refer to like elements.

In the following description, specific details are set forth such as specific quantities, sizes, etc. so as to provide a thorough understanding of embodiments. However, the embodiments presented herein may be practiced without such specific details also. In many cases, details concerning such considerations and the like have been omitted inasmuch as such details are not necessary to obtain a complete understanding of various embodiments and are within the skills of persons of ordinary skill in the relevant art.

Referring to the drawings in general, the illustrations are for the purpose of describing particular embodiments and are not intended to be limiting.

Referring to FIG. 1, an example flat panel X-ray detector 100 for acquiring an X-ray image in accordance with an embodiment is shown. In one embodiment, the flat panel X-ray detector 100 comprises an X-ray panel 102, a scintillator layer 104, a reflective layer 106 and a hermetic cover 108. The hermetic cover 108 further comprises a top surface 108-1 and at least one sidewall 108-2 extending away from the top surface 108-1. In one example implementation, at least one sidewall 108-2 may be perpendicular to the top surface 108-1. In alternate implementations, at least one sidewall 108-2 may be inclined from the top surface 108-1 at a suitable angle. The hermetic cover 108 is embedded in a solder seal 110 disposed over the X-ray panel 102 such that, in this example, the hermetic cover 108 does not make direct contact with the X-ray panel 102. The hermetic cover 108 along with the solder seal 110 forms a cover assembly disposed over the X-ray panel 102 for protecting the scintillator layer 104 from moisture ingression. According to one embodiment, the hermetic cover 108 is coupled to the X-ray panel 102 using ultrasound soldering techniques. Though the embodiments presented herein are with reference to a flat panel X-ray detector, the present disclosure may be extended to any radiation detectors such as those used for detecting visible light, infra-red radiation, ultra-violet radiations, and so forth.

An X-ray tube (not shown in FIG. 1) may send a beam of X-ray photons through a target, such as, an object under test or a patient. The X-ray photons that are not absorbed by the target, strike the scintillator layer 104. The scintillator layer 104 may convert the unabsorbed X-ray photons into visible light photons. In one embodiment, the scintillator layer 104 comprises ionic materials, such as, cesium iodide (CsI), although any other suitable ionic materials, for example, cesium iodide crystals doped with thallium (CsI:Tl), thallium doped sodium iodide (NaI:Tl), cesium iodide crystals doped with sodium (CsI:Na), lanthanum bromide (LaBR3), cerium iodide (CeI) and gadolinium oxysulfide, may be used in the scintillator layer 104.

In one embodiment, the X-ray panel 102 comprises a plurality of photo sensor elements (not shown in FIG. 1). The plurality of photo sensor elements may be arranged in many orientations, for example, in columns and rows. The photo sensor elements detect the visible light from the scintillator layer 104 and convert the visible light into corresponding electrical signals. The electrical signals may be used to generate an X-ray image. Any technique known in the art may be used to generate the X-ray image from the electrical signals. In one example implementation, photodiodes are used as the photo sensor elements. Any other types of transducers may be used for converting the incident visible light into appropriate output signals.

In one embodiment, the reflective layer 106 may be placed over the scintillator layer 104. The reflective layer 106 reflects the visible light emitting from the scintillator layer 104 back to the photo sensor elements.

According to one embodiment, the hermetic cover 108 is comprised of a material substantially transparent to radiation in a desired energy range. In the current example, the hermetic cover 108 is comprised of a material substantially transparent to X-rays. In one example, the hermetic cover 108 may be made of a sheet of a metal, such as, aluminum, stainless steel, copper and nickel. In another example, the hermetic cover 108 may be made of glass, graphite, or a high temperature polymer such as a polyetherimide and the like. In yet another embodiment, the hermetic cover 108 may be made of a sheet of a composite material, such as, a carbon-fiber composite sheet, laminated on both sides with aluminum foil. These examples are merely illustrative and the hermetic cover may be made of any other suitable materials.

In an example, the solder seal 110 comprises a low temperature alloy, such as, indium-tin alloy, though any other suitable solder material such as, pure indium or a lead-bismuth alloy may also be used. In one embodiment, a rim of the sidewalls 108-2 is substantially embedded into the solder seal 110 such that, in this example, the rim does not come in direct contact with the X-ray panel 102. In an embodiment, the hermetic cover 108 is soldered to the X-ray panel 102 using ultrasonic soldering technique.

The gap between the X-ray panel 102 and the hermetic cover 108 reduces the likelihood of voids, oxides and other foreign particles in the solder seal 110 from forming a pathway for moisture ingress and thereby reduces the likelihood of the loss in the hermetic quality of the hermetic cover 108.

Figure 2:
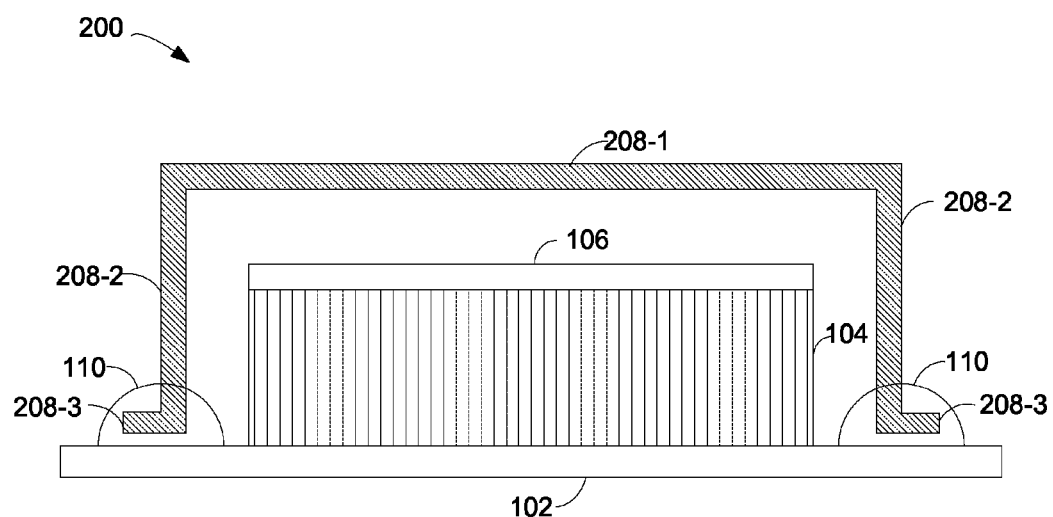
FIG. 2 illustrates a schematic profile of an example flat panel X-Ray detector, according to another embodiment.

FIG. 2 illustrates an exemplary flat panel X-ray detector 200, according to another embodiment. The flat panel X-ray detector 200 comprises a hermetic cover 208. The hermetic cover 208 comprises a top surface 208-1 and at least one sidewall 208-2. The hermetic cover 208 further comprises flanged portions 208-3, herein after interchangeably referred to as feet, in the rim. In one embodiment, the feet 208-3 are embedded substantially completely into the solder seal 110 such that the hermetic cover 208 does not come in direct contact with the X-ray panel 102. In the current example, the feet 208-3 protrude outward from the rim in a substantially horizontal direction as shown in FIG. 2. In another implementation, the feet 208-3 may protrude inward from the rim. In yet another implementation, a portion of the feet 208-3 may protrude outward from the rim and a remaining portion of the feet 208-3 may protrude inward from the rim. The feet 208-3 improve adhesion of the hermetic cover 208 to the X-ray panel 102, thereby increasing the mechanical strength of the joint.

Figure 3:
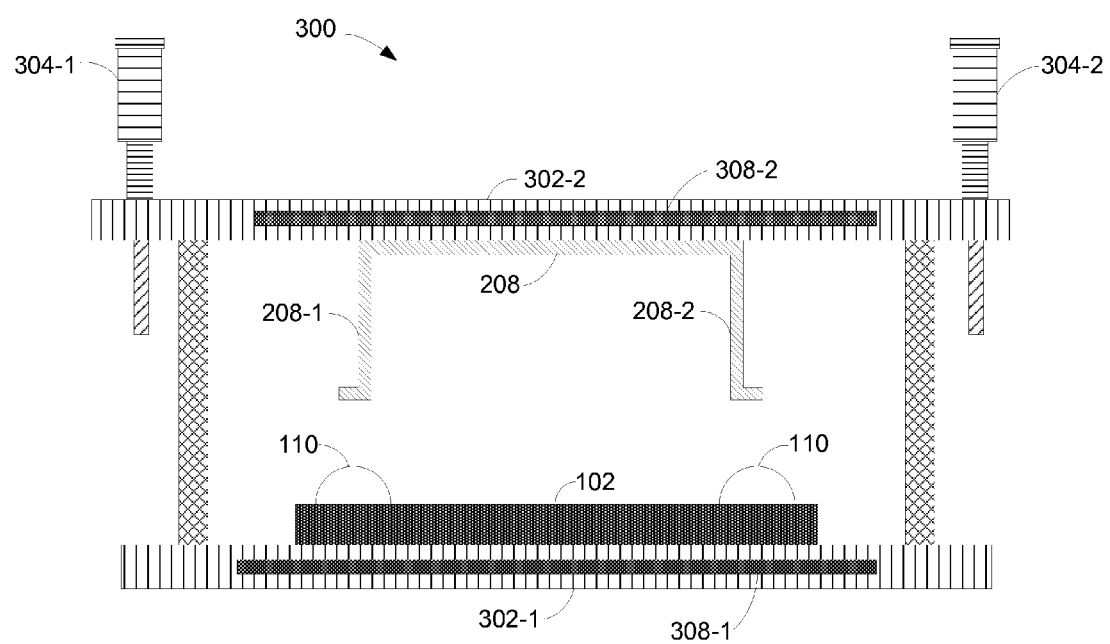
FIG. 3 illustrates an example apparatus for fabricating a flat panel X-ray detector, according to one embodiment.

FIG. 3 is a simplified schematic of an exemplary apparatus 300 for fabricating a flat panel X-ray detector. The apparatus 300 comprises a fixture 302 having a bottom portion 302-1 and a top portion 302-2. The fixture 302 may further comprise one or more heating elements 308-1 and 308-2 in the bottom portion 302-1 and the top portion 302-2 respectively. In one implementation, the fixture 302 controls the temperature and position an X-ray panel 102 and a hermetic cover used for the fabrication of the X-ray detector. The X-ray panel, such as, the X-ray panel 102, having a scintillator layer and a reflective layer formed thereon and the solder seal 110 applied over the X-ray panel 102, is placed over the base portion 302-1. The one or more heating elements may be used for heating the X-ray panel 102 to a temperature just above the melting point of the solder seal 110. Further, the X-ray panel 102 may be aligned using suitable known methods, for example, using one or more banking pins. In one embodiment, the base portion 302-1 may comprise a series of holes and may be connected to a vacuum line for fixing the X-ray panel 102 in place.

The top portion 302-2 suspends the hermetic cover, for example, the hermetic cover 208, over the X-ray panel 102. In an implementation, the hermetic cover 208 may be pre-cleaned in an ultrasonic cleaning bath to remove surface oxides or other contaminants, for example. A portion of the solder seal may also be applied to the rim and/or the feet of the hermetic cover 208. In one implementation, an automatic soldering system may be configured to apply the solder by using ultrasonic soldering in order to maintain good adhesion. The ultrasonic soldering technique provides adequate wetting and strong intermetallic bond of the solder seal to the rim 208-3 and/or feet of the hermetic cover 208 without the use of a flux. In another implementation, the soldering process may be performed in an inert gas environment to reduce the oxidation of the hermetic cover 208.

In one implementation, the hermetic cover 208 with the solder seal at the rim and/or feet may be attached to an underside of the top portion 302-2 of the fixture 302 through one or more vacuum ports. In an example implementation, the vacuum ports may be present in the underside of the top portion 302-2 and may be joined to a main vacuum source on a side of the top portion 302-2. The vacuum ports and the main vacuum source may be configured to attach the hermetic cover 208 to the underside of the top portion 302-2. When the vacuum is removed, the hermetic cover 208 may be released from the underside of the top portion 302-2.

The top portion 302-2 is further configured to lower the hermetic cover 208 such that the hermetic cover 208 is in contact with the solder pre-form 110. In one embodiment, the hermetic cover 208 is suspended above the X-ray panel 102 by a distance of about 0.5 millimeters. The heating elements 308-1 and 308-2 of the fixture 302 may be configured to heat the X-ray panel 102 and/or the hermetic cover 208 to a temperature just above the melting point of the solder seal 110 to melt the solder seal 110. Further, the hermetic cover 208 is further lowered such that the rim and/or the feet of the hermetic cover 208 are suspended substantially completely into the molten solder seal 110 without touching the X-ray panel 102. In one embodiment, one or more micrometers 304-1 and 304-2, hereinafter collectively referred to as the micrometers 304, are configured to adjust the distance between the top portion 302-2 and the base portion 302-1. In an embodiment, the micrometers 304 may be placed at the four corners of the assembly fixture.

The apparatus 300 may further comprise an agitating means (not shown in FIG. 3) for agitating the solder seal 110. The solder seal 110 is agitated to ensure wetting of the solder seal applied on the X-ray panel 102 and/or the hermetic cover 208, to ensure strong metallic bond integrity and/or to displace any voids, oxides and/or particulates trapped within the solder seal to the surface of the solder seal. In one embodiment, the agitating means may be any known ultrasonic agitator agitating the solder seal 110 ultrasonically. In another embodiment, the solder seal may be mechanically agitated using mechanical vibrations. In one implementation, the apparatus 300 may comprise an ultrasonic means for passing ultrasonic vibrations through the solder seal 110 and/or the hermetic cover 208. The hermetic cover 108 and the X-ray panel 102 may be bonded via the solder seal 110.

In an alternate embodiment, the apparatus 300 is contained within an oven, in a nitrogen atmosphere. In this case, the apparatus 300 might not include the heating elements 308-1 and 308-2. Instead, the oven itself may be heated to just above the melting point of the solder seal to melt the solder seal 110. Nitrogen atmosphere helps prevent oxidation of the solder seal 110 and therefore, may limit the moisture ingression into the scintillator layer during the sealing process.

Figure 4:
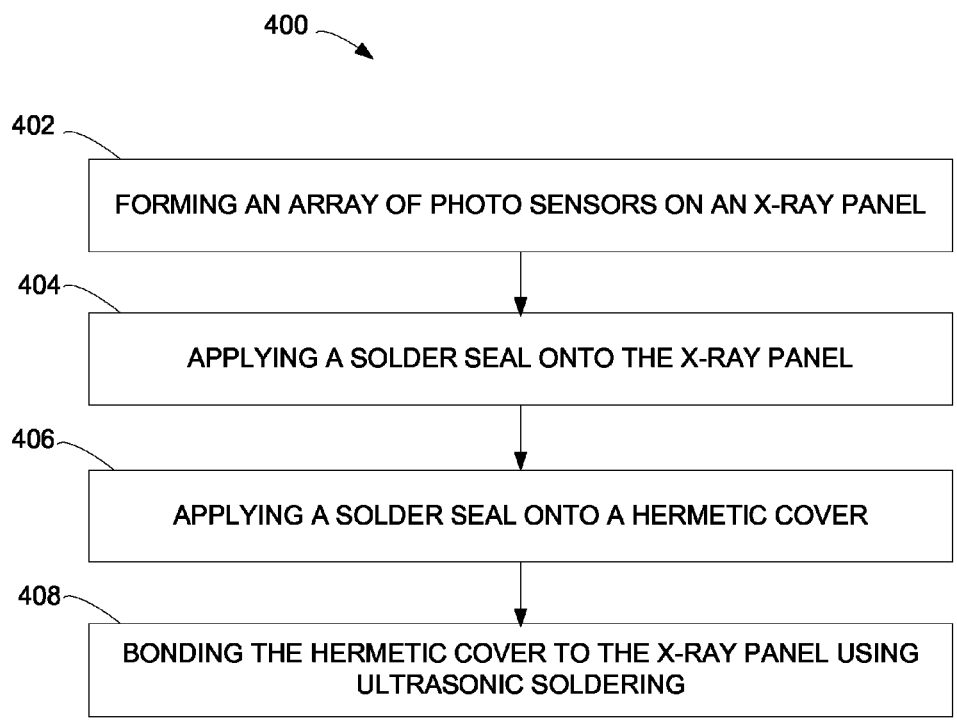
FIG. 4 is a flowchart illustrating an example method of fabricating a radiation detector, according to one embodiment.

Referring now to FIG. 4, a flowchart is shown illustrating an exemplary method 400 of fabricating a flat panel X-ray detector, according to one embodiment. At step 402, an array of photo sensors is formed on an X-ray panel. In one embodiment, the array of photo sensors may be arranged in any orientation. In an example implementation, the photo sensors may comprise photodiodes. Further, a scintillator layer is formed over the X-ray panel. In addition, a reflective layer may be placed over the scintillator layer. Subsequently, the X-ray panel having the scintillator layer and the reflective layer is placed on a flat base plate of an assembly fixture having a heating element for heating the X-ray panel.

Further, at step 404, a solder seal is applied onto the X-ray panel. In one embodiment, the solder seal is applied to the perimeter of the X-ray panel. Examples of the solder seal comprise a low temperature alloy, such as, indium-tin alloy. In further implementation, the solder seal may comprise pure indium solder, or a lead-bismuth alloy. In one example embodiment, a pre-formed ribbon of the solder seal is placed on the X-ray panel. Alternatively, the solder seal may be a wire or any other suitable shape.

At step 406, a solder seal is applied onto a hermetic cover. In one embodiment, the hermetic cover may be pre cleaned in an ultrasonic bath in order to remove surface oxides, and other contaminants. Subsequently, the solder seal may be applied at a rim and/or a foot of the hermetic cover. In another embodiment, the solder seal may be applied directly on the X-ray panel and the hermetic cover.

Subsequently, at step 408, the hermetic cover is bonded to the X-ray panel using ultrasonic soldering technique. For this, the X-ray panel and/or the hermetic may be aligned using the assembly fixture. In one embodiment, the hermetic cover and the X-ray panel are aligned such that the rim and/or the feet of the hermetic cover are directly placed above the solder seal placed on the X-ray panel. Subsequently, the hermetic cover and the X-ray panel may be heated to a temperature just above the melting point of the solder seal. In one embodiment, the hermetic cover and the X-ray panel are heated using one or more heating elements within the assembly fixture. The hermetic cover may then be further lowered into the molten solder seal on the X-ray panel. In one example, the rim and/or the feet of the of the sidewall(s) of the hermetic cover is substantially embedded in the solder seal such that the hermetic cover does not come in direct contact with the X-ray panel. In one embodiment, the rim of the sidewalls may comprise flanged portions horizontally protruding away from the sidewalls, and the flanged portions may be substantially embedded into the solder seal. In one embodiment, a standoff height i.e., a distance between the hermetic cover and the X-ray panel may be maintained using one or more micrometers placed at four corners of the assembly fixture.

Subsequently, the solder seal may be agitated using ultrasonic vibrations so that the hermetic cover and the X-ray panel are bonded together. In one embodiment, the hermetic cover may be bonded to the X-ray panel by slowly and gently vibrating the hermetic cover to agitate the solder seal, thereby causing the solder seal to join the X-ray panel and the hermetic cover. In another embodiment, the solder seal may be agitated by using ultrasonic vibrations which results in soldering the hermetic cover and the X-ray panel together. Once the hermetic cover is bonded to the X-ray panel, the X-ray panel and the hermetic cover may be cooled down in order to solidify the solder seal. Upon solidification of the solder seal, the vacuum source coupled to the fixture may be removed and the hermetically sealed X-ray detector may be released.

While the invention has been described in considerable detail with reference to a few exemplary embodiments only, it will be appreciated that it is not intended to limit the invention to these embodiments only, since various modifications, omissions, additions and substitutions may be made to the disclosed embodiments without materially departing from the scope of the invention. In addition, many modifications may be made to adapt to a particular situation or an installation, without departing from the essential scope of the invention. Thus, it must be understood that the above invention has been described by way of illustration and not limitation. Accordingly, it is intended to cover all modifications, omissions, additions, substitutions or the like, which may be included within the scope and the spirit of the invention as defined by the claims.

The invention claimed is:

1. A detector comprising:
an X-ray panel;
a scintillator layer disposed on a first surface of the X-ray panel;
a hermetic cover that covers the scintillator layer, wherein the hermetic cover comprises a top surface and at least one sidewall extending away from the top surface; and
a solder seal disposed between the hermetic cover and the X-ray panel, wherein a rim of the sidewall is substantially embedded within the solder seal whereby the rim does not directly contact the X-ray panel.

2. The detector of claim 1, wherein the hermetic cover comprises at least one of a metal, glass, graphite, a high temperature polymer, and a laminated composite material.

3. The detector of claim 2, wherein the hermetic cover comprises at least one of aluminum, stainless steel, copper, nickel and a polyetherimide.

4. The detector of claim 1, wherein the rim comprises a flanged portion, wherein the flanged portion is substantially completely embedded within the solder material.

5. The detector of claim 1, wherein the solder seal comprises at least one of indium-tin alloy, a pure indium, and lead-bismuth alloy.

6. The detector of claim 1, wherein the scintillator layer comprises at least one of cesium iodide (CsI), cesium iodide crystals doped with thallium (CsI:Tl), thallium doped sodium iodide (NaI:Tl), cesium iodide crystals doped with sodium (CsI:Na), lanthanum bromide (LaBR3), and cerium iodide (CeI).

7. A method comprising:
forming an array of detector elements on an X-ray Panel; and
bonding a hermetic cover to the X-ray panel using ultrasonic soldering, wherein the hermetic cover comprises a top surface and at least one sidewall extending away from the top surface, and wherein a rim of the sidewall is substantially embedded within a solder seal whereby the rim does not directly contact the X-ray panel.

8. The method of claim 7, wherein the hermetic cover comprises at least one of a metal, glass, graphite, a high temperature polymer, and a laminated composite material.

9. The method of claim 8, wherein the hermetic cover comprises at least one of aluminum, stainless steel, copper, nickel and a polyetherimide.

10. The method of claim 7, wherein the rim comprises a flanged portion, wherein the flanged portion is substantially completely embedded within the solder seal.

11. The method of claim 7, wherein the solder seal comprises at least one of indium-tin alloy, a pure indium, and lead-bismuth alloy.

12. The method of claim 7, further comprising disposing a pre-formed ribbon of the solder seal on the X-ray panel.

13. The method of claim 7, further comprising applying the solder seal to the rim of the sidewall of the hermetic cover using ultrasonic energy.

14. The method of claim 7, further comprising vibrating the hermetic cover to agitate the solder seal.

15. The method of claim 7, further comprising agitating the solder seal using ultrasonic energy.

16. The method of claim 7, further comprising depositing a scintillator layer on a first layer of the X-ray panel.

17. An apparatus comprising:
a flat panel substrate;
a radiation sensing structure on a first surface of the flat panel substrate;
an hermetic cover that covers the radiation sensing structure, wherein the hermetic cover comprises a top surface and a sidewall extending perpendicularly away from the top surface and wherein the hermetic cover is substantially transparent to radiation; and
a solder seal disposed between the hermetic cover and the flat panel substrate, wherein a rim of the sidewall is substantially embedded within the solder seal, whereby the rim does not directly contact the flat panel substrate.

18. The apparatus of claim 17, wherein the hermetic cover comprises at least one of a metal, glass, graphite, a high temperature polymer, and a laminated composite material.

19. The apparatus of claim 17, wherein the rim comprises a flanged portion, wherein the flanged portion is substantially completely embedded within the solder material.

20. The apparatus of claim 17, wherein the solder seal comprises at least one of indium-tin alloy, a pure indium, and lead-bismuth alloy.

* * * * *